(No Model.)

T. J. REGNIER.
BICYCLE SADDLE.

No. 334,469. Patented Jan. 19, 1886.

WITNESSES:
James Anderton
George L. Hersey

INVENTOR
Theophile J. Regnier
BY
H. C. Bliss
ATTORNEY

UNITED STATES PATENT OFFICE.

THEOPHILE J. REGNIER, OF SPRINGFIELD, MASSACHUSETTS.

BICYCLE-SADDLE.

SPECIFICATION forming part of Letters Patent No. 334,469, dated January 19, 1886.

Application filed May 8, 1885. Serial No. 164,739. (No model.)

*To all whom it may concern:*

Be it known that I, THEOPHILE J. REGNIER, a citizen of the Province of Quebec, Canada, residing at Springfield, in the county of Hampden and State of Massachusetts, United States of America, have invented new and useful Improvements in Bicycle Saddles and Saddle-Springs, of which the following is a specification.

My invention relates, principally, to a class of bicycle-saddles in which the seat is formed of a flexible material suspended between two supports which rest upon a spring beneath, as shown in the accompanying drawings, in which—

Figure 1:
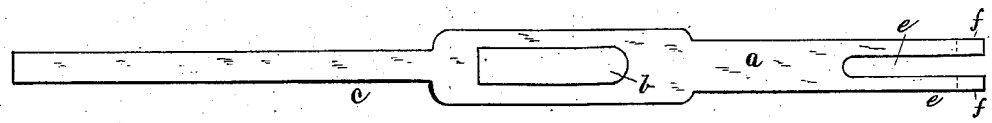
Figure 2:
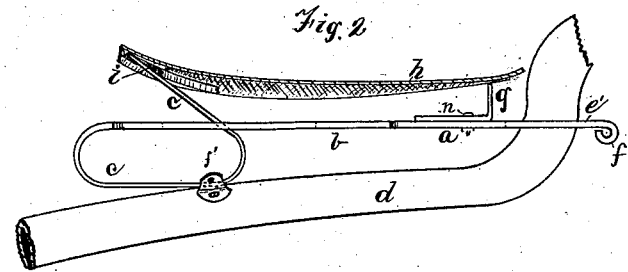
Figure 3:
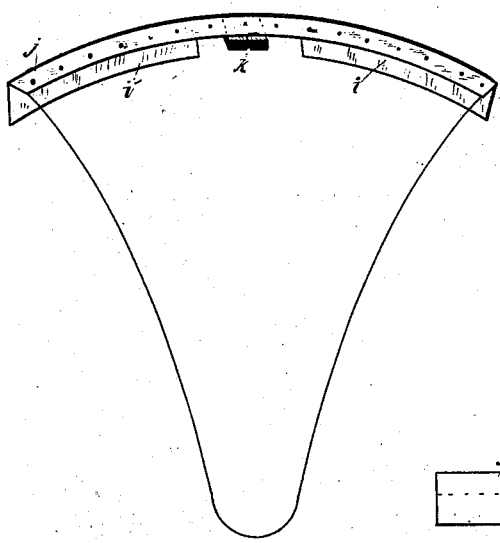
Figure 4:
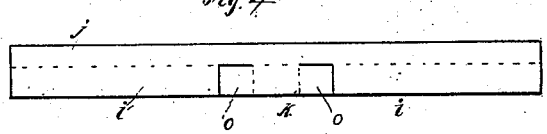

Figure 1 is a blank or form of spring and plate before bending. Fig. 2 is a vertical section of device; Fig. 3, segmental bar as shaped for attachment to seat and spring. Fig. 4 is a blank or form of segmental bar or frame for suspending seat before shaping. Fig. 5 is a view of clamp for retaining spring.

In Fig. 1, $h$ is a flexible seat, suspended forward and back from segmental bar $i$ and adjustable standard $q$. The bar $i$ is connected with spring $c$ by means of socket $k$, into which the end of the spring is inserted. Standard $q$ is secured to and adjustable with plate $a$ by means of bolt $n$, passing through slot $e$, in the usual manner. Spring $c$ and spring-plate $a$ are preferably made integral with each other, and shaped from the blank shown in Fig. 1. The desired shape is secured by curving the end $c$ to a semicircular form, passing it through slot $b$ in plate $a$, and then bringing it up to the required height for the seat $h$. The flanged segmental bar $i$, Fig. 3, is shaped from blank shown in Fig. 4 by bending it laterally along the dotted line to form the flanges $j$ and $i'$, then curving it longitudinally, and then folding in the tongues $o$ to form box or socket $k$, adapted to receive the end of spring $c$, as shown. The spring-plate $a$, Fig. 2, is at the forward end attached to the neck of the bicycle by means of loops $f$, in the usual manner, and is loosely secured at the rear end to the perch $d$ by means of clamp $f'$, through which it passes under pin $t'$, as seen in Fig. 5. To facilitate the removal of the spring, the pin $t'$ is screwed into the shoulders $r$, from which it can be readily removed. The seat $h$ is made of leather or other flexible material, and is riveted or otherwise secured to bar $i$ and standard $q$. The tightening of the flexible seat is effected by sliding forward the standard $q$ under the bolt-clamp $n$. In my said device a spring of considerable length is secured within a limited space, and the space under the flexible seat is left unincumbered, thus giving room for the settling down of the seat when pressed upon. The spring-plate $a$ is itself made flexible. and, resting loosely on clamp $f'$, is capable of bending throughout its entire length in response to pressure upon the seat. As will be seen, the clamp $f'$ affords a fulcrum for the spring, working on a leverage in opposite directions from that point. The spring $c$ may, if desired, be riveted upon the rear end of spring-plate $a$, instead of being integral with it, without departing from the scope of my invention, and the seat $h$ may be made rigid instead of flexible.

Having now fully described my invention, what I claim, and desire to secure by Letters Patent, is—

1. A bicycle saddle - spring consisting of plate $a$, with spring-extension $c$ at the rear end, bent downward and forward until it rests upon the perch, then backward and upward to engage the seat-frame $i$, substantially as described.

2. In a suspension-saddle for bicycles, the combination, with flexible seat $h$, of segmental bar $i$, provided with flange $j$, and box $k$, made from folded tongues $o$, substantially as described.

3. In a bicycle-saddle, the combination of flexible seat $h$, spring and spring-plate $a$ and $c$, made integral with each other, adjustable standard $q$, and segmental bar $i$, provided with socket $k$, substantially as described.

4. A bicycle saddle - spring consisting of spring-plate $a$, attached at its forward end to the neck of the bicycle, and having at its rear end the spring-extension $c$, bent to a circular form and passing in the course of its curvature through slot $f$ in said plate, and adapted to engage the saddle-seat, substantially as described.

THEOPHILE J. REGNIER.

Witnesses:
H. C. BLISS,
GEORGE L. HERSEY.